Figure 1:
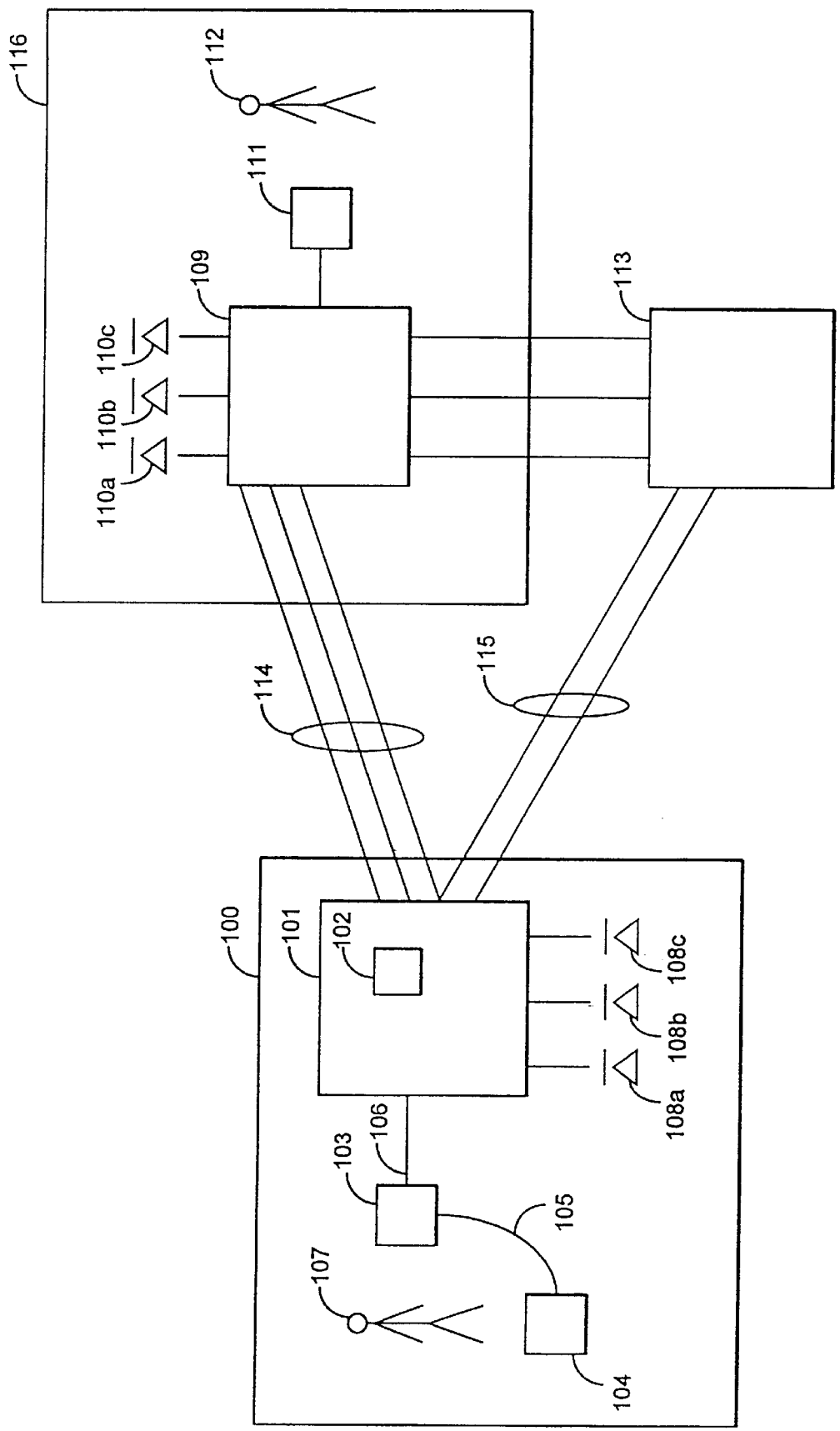

United States Patent
Jyvälä et al.

[11] Patent Number: 6,084,957
[45] Date of Patent: Jul. 4, 2000

[54] METHOD FOR SETTING UP A TELEPHONE CONNECTION AND AN EXCHANGE SYSTEM

[75] Inventors: Petri Jyvälä; Jouni Kinnunen, both of Oulu, Finland

[73] Assignee: Nokia Telecommunications, Espoo, Finland

[21] Appl. No.: 08/952,043

[22] PCT Filed: May 23, 1996

[86] PCT No.: PCT/FI96/00288

§ 371 Date: Nov. 4, 1997

§ 102(e) Date: Nov. 4, 1997

[87] PCT Pub. No.: WO96/37988

PCT Pub. Date: Nov. 28, 1996

[30] Foreign Application Priority Data

May 26, 1995 [FI] Finland ..................................... 952586

[51] Int. Cl.[7] .................................................... H04M 3/00
[52] U.S. Cl. ........................................... 379/266; 379/265
[58] Field of Search ..................................... 379/265, 266, 379/209, 201, 142

[56] References Cited

U.S. PATENT DOCUMENTS

| | | | |
|---|---|---|---|
| 4,991,203 | 2/1991 | Kakizawa | 379/209 |
| 5,040,208 | 8/1991 | Jolissaint | 379/209 |
| 5,155,761 | 10/1992 | Hammond | 379/88.2 |
| 5,311,574 | 5/1994 | Livanos | 379/88 |
| 5,444,774 | 8/1995 | Friedes | 379/266 |

FOREIGN PATENT DOCUMENTS

| | | |
|---|---|---|
| 435 449 | 7/1991 | European Pat. Off. . |
| 539 105 | 4/1993 | European Pat. Off. . |
| 587 950 | 3/1994 | European Pat. Off. . |

*Primary Examiner*—Creighton Smith
*Attorney, Agent, or Firm*—Pillsbury Madison & Sutro

[57] ABSTRACT

A system and method for setting up a telephone connection which system comprises several exchange systems (100 and 116). A queuing list is used in the method, which list is maintained in such a manner that when no free connection is available, the operator (107) places information about the received call order in the queuing list to wait for a connection to become free. In the method, the loading of connections (108a to 108c, 114, & 115) is monitored, and when the required connections (108a to 108c, 114, & 115) is detected to be free, the connection (108a to 108c, 114, & 115) is reserved for the use of the operator (107) and the operator (107) is sent information about the call order on the queuing list. After this, the operator can put the call through. The method makes the search for free connection automatic in congested directions and therefore the work of the operators (107) will be easier.

14 Claims, 2 Drawing Sheets

METHOD FOR SETTING UP A TELEPHONE CONNECTION AND AN EXCHANGE SYSTEM

This application is the national phase of international application PCT/FI96/00288, filed May 23,1996 which designated the U.S.

The present invention relates to a method for setting up a telephone connection in a telephone system when the telephone system comprises several exchange systems, which exchanges are connected to one or more other exchanges, to one or more subscriber terminal equipments and to work stations of one or more operators.

The present invention also relates to an exchange system comprising an exchange, one or more operators, one or more work stations and one or more subscriber terminal equipments with a connection to the exchange.

The telephone system comprises exchange systems including subscriber terminal equipments and one or more operators. The operator often uses a server containing statistical data on the calls already made and information connected to call orders made in advance.

Any subscriber (subscriber A) can make a call order, that is, order a call in advance from a server in order to contact another subscriber (subscriber B). At the ordered time, the operator calls both subscriber A and subscriber B and after having reached them both, establishes a connection between them. When the exchange is realized with an automatic DX 200 exchange, for example, local calls can be executed easily. But long-distance calls may be problematic at peak times as there are only a few connections between the exchanges when compared with the number of subscribers connected to the exchanges. The situation is like this at exchanges that handle telephone connections to an oil field, for example, which exchange may include as many as millions of subscribers but from which there are only some tens of outgoing connections. In that case, the operator has to attend to the setting-up of both direct and ordered long-distance calls.

It is difficult to set up a call during peak time as the operator has to check by trying again and again at short intervals if a connection has become free so that the ordered call could be put through. It is very frustrating to try again constantly. The operator cannot know when a connection is free and he/she can lose many possibilities before being successful. Further, operators at different exchanges will very easily start competing for the same connections as incoming and outgoing calls both use the same connections.

The object of the present invention is to accomplish an exchange system in which an operator need not try repeatedly to put a call through without knowing when a free connection is available.

This is achieved with the method shown in the preamble that is characterized in that in the method a specified queuing list is used, which list is maintained in such a manner that when no free connection is available, the operator places information about the received call order in the queuing list to wait for a connection to become free; and that in the method the loading of the connections is monitored, and when the required connection is detected to be free, said connection is reserved for the use of the operator and the operator is sent information about the call order waiting on the queuing list.

The exchange system according to the invention is characterized in that the exchange system comprises means for maintaining a queuing list on which information about the call order is placed to wait for a connection to become free when no free connection is available; means for monitoring the loading of the connections and for detecting a free connection, means for reserving said free connection to the use of the operator; and means for sending information to the operator about the call order on the queuing list when a free connection is available.

Considerable advantages are achieved with the invention. The queuing for free connections connected to the setting-up of calls becomes automatic and at the same time the competition between the operators for free connections will cease. In the method according to the invention, a connection that has become free is automatically reserved for the use of the operator for setting up a connection. When the operator has to attend to a great number of calls in a congested situation, the method according to the invention helps to set up calls in an appropriate order without some subscriber being favoured unnecessarily or a call order of some subscriber being forgotten. The use of an ISDN bus between the exchange system and the operator work station allows high-speed transmission.

Figure 2:
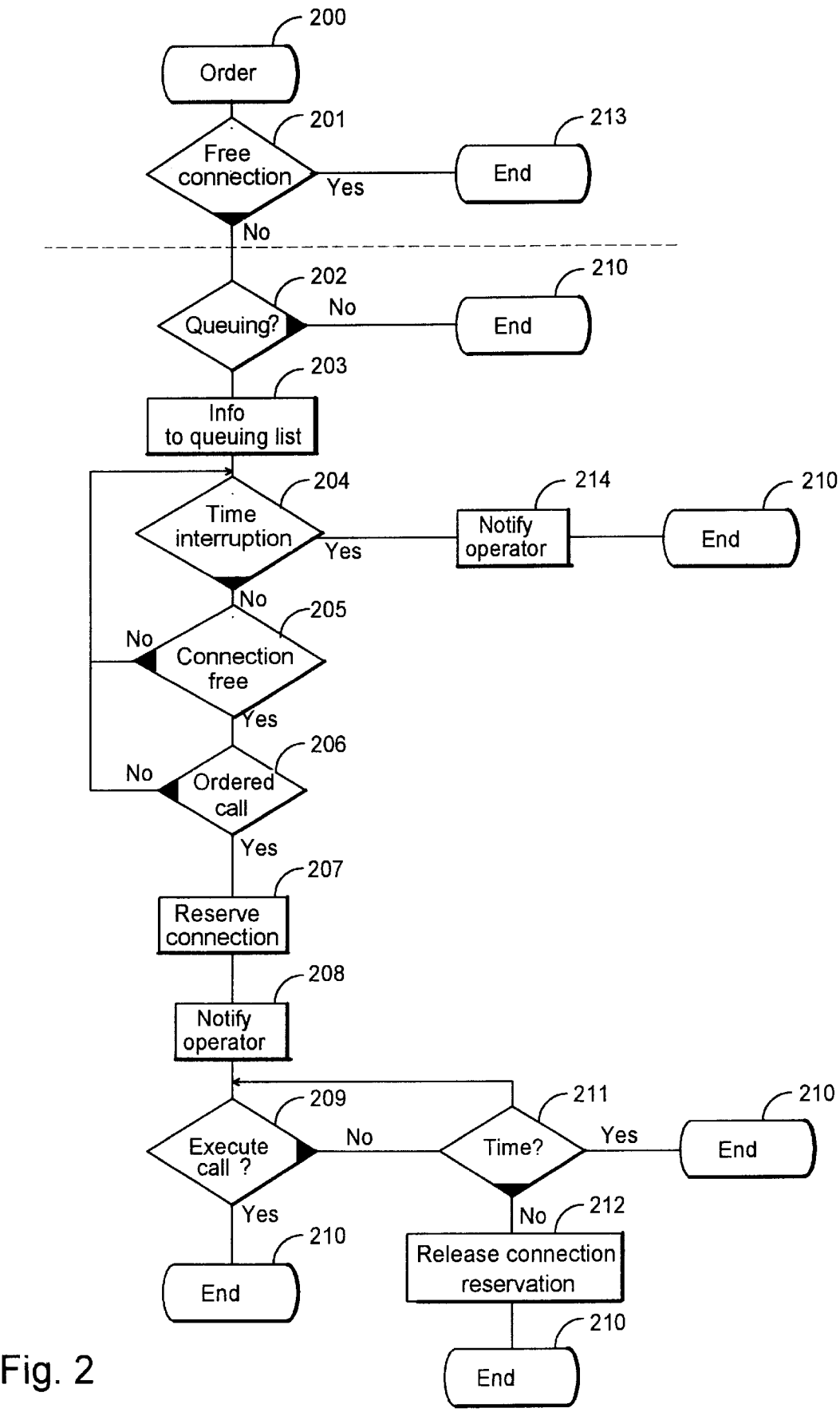

In the following, the invention will be explained in more detail with reference to the examples according to the drawings, in which FIG. 1 illustrates a block diagram of one possible way of realizing a telephone system according to the invention in essential parts, and FIG. 2 shows a flow chart of a method for setting up a connection.

The block diagram shown in FIG. 1, the block diagram being only one solution according to the invention, illustrates a telephone system comprising three exchange systems 100, 113 and 116, work stations 103 and 111, one or more operators 107, 112 in the exchange systems 100 and 116, a server 104 and subscriber terminal equipments 108a to 108c and 110a to 110c. An exchange 101 comprises means 102 for maintaining a list of queuing and for communicating with the work station 103 of an ISDN bus (Integrated Services Digital Network) 106, for example. In this example, three connections 114 are drawn between exchanges 101 and 109 and two connections 115 between exchanges 101 and 113. For example, LAN (Local Area Network) can function as a connection 105 between the server and the work station.

In the solution according to the invention, a person calling from some subscriber terminal equipment 108a to 108c has to order long-distance calls, that is, calls requiring connections e.g. between exchanges 101 to 109 from the call operator 107. The subscriber 108a to 108c can make a call order by calling the operator 107 directly or by storing information about the desired call order to the memory of the server 104 in advance. The call order and the information often stored into the memory about it commonly include information about subscriber A and subscriber B and the time of calling, for example. When it is time to set up the ordered call, the operator receives from the server 104 a notification and setting-up information about establishing the call. Because there are only a few connections 114 between the exchanges 101 and 109 when compared with the number of long-distance calls, the possibility to make a long-distance call generally has to waited. In congested situations a long-distance call is required from several subscriber terminal equipments 108a to 108c and at the same time notifications of long-distance calls from the server 104 arrive at the work station 103 of the operator 107. At the same time, long-distance call orders arrive similarly at the work stations 111 of the operators 112 in some other exchange system and many of them are also directed to the exchange 101. Then the operators 107 and 112 have to know exactly when the connection becomes free so that a new call can be put through. In the solution according to the invention, the exchange 101 comprises means 102 for monitoring the loading of the connections (108a to 108c, 114 and 115) and for detecting that the required connection (108a to 108c, 114 and 115) has become free. When a free connection is found, it is reserved for the use of the operator 107 and the operator 107 is sent information about the call order that has waited the longest time on the queuing list. The connection is reserved for a predetermined period of time so that the operator 107 can make the connection.

In a preferred embodiment of the invention, calls are on the queuing list in the order that they have been placed in the list, that is, the list is of the FIFO type (First In First Out). In that case, information is given to the operator 107 about two call orders on the queuing list and the one placed first in the list is put through first.

When the operator 107 tries to put the call through to the ordered number and when a direct connection is not possible, the operator 107 can transfer the order to queuing. In a preferred embodiment of the invention, the operator 104 has a work station whose program illustrates on a screen events connected to the exchange 101 and call control possibilities. The operator 107 transfers the order to queuing by pressing a queuing dial. After this, the operator 107 can disconnect himself/herself from this call and serve other subscribers 108a to 108c and notifications from the server 104. When a connection is free, the means 102 monitoring the loading of the connections notify the operator 107 of the connection being free and the connection is reserved. The notification is received from the exchange 101 preferably via the ISDN bus 106. If it is a personal call, the same operator that transferred the call to queuing will receive the notification. If the call order is received from the server 104, the operator 107 that has been free the longest time will receive the notification.

When the connection is ready for subscriber B, who is one of the subscribers 110a to 110c, for example, the operator 107 contacts subscriber A who is one of the subscribers 108a to 108c. If this connection also has to be queued, for example, because subscriber A 108a to 108c is busy, the operator 107 cannot disconnect to serve other subscribers, but the operator 107 has to wait for the connection to become free, the queuing time to end or to interrupt queuing. In all situations queuing is stopped automatically when a predetermined time limit is exceeded or the operator 107 interrupts queuing. The operator 107 receives a notification of the interruption of queuing at his/her work station 104. When the connection becomes free also for subscriber A 108a to 108c, the operator 107 connects the subscribers to one another and generally disconnects from this connection.

FIG. 2 illustrates the solution according to the invention by a flow chart. The method according to the invention is realized in its preferred form as a program that shows the operational possibilities of the operator 107 as windows on the screen of the work station 103, for example. In that case, the exchange system 100 comprises means 102 for carrying out a queuing reservation process that monitors the loading of connections and free connections. The actual queuing program starts from block 202. Before that, that is, above the broken line in the flow chart, the operator 107 carries out routine procedures that are executed manually by the operator 107.

In block 200 the operator 107 receives a call order after which the operator 1047 tries if the call can be put through (block 201). If a free connection is available, the call is put through and the routine of the flow chart ends in block 213. In a case in which the call cannot be put through directly (block 202), the queuing reservation program is started and the information about the order can be transferred to queuing (block 203) or the execution of the program can be ended (block 210). Then it is inquired on the screen of the work station 103 of the operator 107 if the information about the order is to be transferred to queuing and the operator 107 can dial either a positive or a negative answer, wherein the execution of the program will continue or end. Whenever the execution of the program ends (block 210) or the routine ends (block 213), the operator 107 sets into a stand-by position for handling the next call order. Queuing time is monitored in the queue and interruptions in block 204. If the operator 107 interrupts queuing or queuing time ends, the program notifies the operator 107 (block 214) and the execution of the program will end. When the program continues, the program monitors and waits for a free connection (block 205) and its time for setting-up in block 206. Information about the calls are on the queuing list in the order they are placed in the list. Therefore of two call orders on the queuing list the one placed first in the list is notified to the operator 107 first and set up first. When it is time for the ordered call, a connection is reserved (block 207) and the operator 107 is notified (block 208). When the operator 107 has a notification of the call order and a reserved connection, it is checked whether the call is to be put through (block 209). Time supervision is also connected to the reservation of the connection (block 211), and if the operator does not put the call through within a predetermined period of time, the connection becomes free for other orders in block 212 and the execution of the program ends (block 210). When the operator puts the call through within the reserved period, the queuing reservation process connected to the order ends in block 210.

Although the invention is above explained with reference to the examples according to the drawings, it is evident that the invention is not restricted thereto, but it can be modified in many ways within the inventive idea disclosed in the appended claims.

What is claimed is:

1. A method for setting up a telephone connection in a telephone system which comprises several exchange systems (100 and 116), each exchange system having an exchange which is connected to at least one other exchange, to one or more subscriber terminal equipments (108a to 108c and 110a to 110c) and to work stations (103 and 111) of one or more operators (107 and 112), wherein a specified queuing list is provided for storing received call orders and is maintained such that when no free connection is available, the operator (107) places information about a received call order in the queuing list to wait for a connection to become free;

and in the method the availability of connections (108a to 108c, 114 and 115) is monitored, and when a required connection (108a to 108c, 114 and 115) is detected to be free, said connection (108a to 108c, 114 and 115) is reserved for the use of the operator (107) and the operator (107) is sent information about the received call order waiting on the queuing list.

2. A method according to claim 1, wherein after the operator (107) has transferred information about the call order to the queuing list, the operator (107) assumes a stand-by position for handling a next call order.

3. A method according to claim 1, wherein when the operator (107) is sent information about a call order on the queuing list, information about the call order is deleted from the queuing list.

4. A method according to claim 1, wherein one or more servers (104) each having a connection to one of the exchanges are used in the method;

and a call order comes directly from a subscriber terminal equipment (108a to 108c) or is sent from a server (104) to which call orders have been supplied in advance.

5. A method according to claim 1, wherein the operator (107) is sent information about the call orders on the queuing list in the order the call orders have been placed in the queuing list.

6. A method according to claim 1, wherein the information about the received call order is maintained on the queuing list for a predetermined queuing time.

7. A method according to claim 6, wherein the operator (107) is sent a notification of the ending of queuing after the predetermined queuing time has terminated.

8. Method according to claim 1, wherein the operator (107) interrupts queuing when required.

9. A method according to claim 1, wherein a connection is reserved for the use of the operator (107) for a predetermined reservation time.

10. An exchange system (100) comprising an exchange (101) having connections to at least one other exchange, one or more operators (107), one or more work stations (103) and one or more subscriber terminal equipments (108a to 108c) each having a connection to the exchange (101), wherein the exchange system (100) comprises:

means (102) for maintaining a queuing list on which information about a call order is placed to wait for a connection to become free when no free connection is available, means (102) for monitoring the availability of connections (108a to 108c, 114 and 115) and for detecting a free connection (108a to 108c, 114 and 115);

means (102) for reserving the detected free connections (108a to 108c, 114 and 115) to the use of the operator (107);

and means (102) for sending information to the operator about the call order on the queuing list when the free connection (108a to 108c, 114 and 115) is available.

11. An exchange system according to claim 10, wherein the exchange system also comprises a server (104) to which call orders are supplied in advance;

and the call orders come directly from the subscriber terminal equipments (108a to 108c) to the operator (107) or the call orders are sent from the server (104).

12. An exchange system (100) according to claim 10, wherein the exchange system (100) comprises means (102) for sending information about call orders to the operator (107) in the same order that information about the call orders has been placed in the queuing list.

13. An exchange system (100) according to claim 10, wherein the exchange system (100) comprises means (102) for deleting from the queuing list information about a call order when information about the call order is sent to the operator (107).

14. An exchange system (100) according to claim 10, wherein the exchange system (100) comprises an ISDN bus (106) via which the exchange (101) and at least one of the work stations (103) communicate.

* * * * *

UNITED STATES PATENT AND TRADEMARK OFFICE
CERTIFICATE OF CORRECTION

PATENT NO. : 6,084,957
DATED : July 4, 2000
INVENTOR(S) : JYVALA et al.

It is certified that error appears in the above-identified patent and that said Letters Patent is hereby corrected as shown below:

On the title page,

[[73] Please change Assignee: "Nokia Telecommunications" to --Nokia Telecommunications Oy--.

Signed and Sealed this

First Day of May, 2001

Attest:

NICHOLAS P. GODICI

Attesting Officer     Acting Director of the United States Patent and Trademark Office